US007152090B2

(12) United States Patent
Amirisetty et al.

(10) Patent No.: US 7,152,090 B2
(45) Date of Patent: Dec. 19, 2006

(54) METADATA-AWARE ENTERPRISE APPLICATION INTEGRATION FRAMEWORK FOR APPLICATION SERVER ENVIRONMENT

(75) Inventors: Venkat Amirisetty, Santa Clara, CA (US); Pavan S. Bhatnagar, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 822 days.

(21) Appl. No.: 10/051,441

(22) Filed: Jan. 18, 2002

(65) Prior Publication Data

US 2003/0018832 A1 Jan. 23, 2003

Related U.S. Application Data

(60) Provisional application No. 60/295,119, filed on Jun. 1, 2001.

(51) Int. Cl.
*G06F 15/16* (2006.01)
*G06F 7/00* (2006.01)
*G06F 3/00* (2006.01)

(52) U.S. Cl. .................. 709/200; 707/101; 719/316
(58) Field of Classification Search ................ None
See application file for complete search history.

(56) References Cited

U.S. PATENT DOCUMENTS 5,329,619 A * 7/1994 Page et al. ............ 709/203

6,708,186 B1 * 3/2004 Claborn et al. ........... 707/102
6,760,734 B1     7/2004 Stephens
6,832,238 B1 * 12/2004 Sharma et al. ............ 709/201
6,854,122 B1 * 2/2005 Sheriff et al. ............. 719/316

OTHER PUBLICATIONS

Rahul Sharma, "Java™ 2 Enterprise Edition J2EE™ Connector Architecture Specification," Sun Microsystems, Oct. 16, 2000, (185 Pages).

* cited by examiner

*Primary Examiner*—Wen-Tai Lin
(74) *Attorney, Agent, or Firm*—Robert C. Kowert; Meyertons, Hood, Kivlin, Kowert & Goetzel, P.C.

(57) ABSTRACT

A metadata-aware Enterprise Application Integration (EAI) framework for an application server environment. The framework allows the connector writer to connect to a system using a low-level API. The framework provides a space in a connector in which to define high-level functions. Using the framework, the user can mine metadata for the functions and generate a description of each high-level function that can be dropped into the framework and appear as a high-level function invokable through the connector. This high-level function manifestation, when invoked, drives the low-level API provided by the connector. An adaptive layer may wrap a native Common Client Interface (CCI) exposed by a connector to provide an abstract connector that allows a higher-level abstraction of external Enterprise Information Systems (EIS). The adaptive layer may interpret metadata to model an external EIS as a logical data source. The adaptive layer may be referred to as a metadata-aware CCI adapter.

85 Claims, 7 Drawing Sheets

Inbound scenario

METADATA-AWARE ENTERPRISE APPLICATION INTEGRATION FRAMEWORK FOR APPLICATION SERVER ENVIRONMENT

PRIORITY CLAIM

This application claims benefit of priority of provisional application Ser. No. 60/295,119 entitled "Metadata Aware EAI Integration Framework For Application Server Environment" filed Jun. 1, 2001, whose inventors are Venkat Amirisetty and Pavan S. Bhatnagar, which is hereby incorporated by reference in its entirety.

BACKGROUND OF THE INVENTION

1. Field of the Invention

This invention relates to enterprise information systems, and more particularly to a system and method for providing a metadata-aware Enterprise Application Integration (EAI) framework for an application server environment.

2. Description of the Related Art

The Java 2 Enterprise Edition (J2EE) provides a standard platform for developing various flavors of applications using Java Server Page (JSP), Servlets and Enterprise JavaBeans (EJBs). This standard platform may be used to implement Mission critical enterprise applications using Java & J2EE. The declarative deployment model of J2EE to specify transactional, secure semantics is very well received and accepted. A Java system implementation that adheres to the standard platform specifications of J2EE may be described as a 'container' or application server in which J2EE applications execute. Enterprises may desire to have their J2EE applications interact with Enterprise Information Systems (EIS) and any of various applications including proprietary, standalone and in-house/partner applications that are external to the container. The container may be viewed as a front-end system, and the external applications or EIS as back-end systems. Front-end and back-end are terms used to characterize program interfaces and services relative to the initial user of these interfaces and services. (The "user" may be a human being or a program.) A front-end is one that users interact with directly. A back-end serves indirectly in support of the front-end services. As an example, a front-end system might interface directly with users and forward requests to a remotely located back-end system to get requested data or perform a requested service. A backend system (e.g. EIS system) may be any of various types of systems that provide one or more services including database systems, other application servers, and systems capable of performing business functions not provided by the front-end system.

The Java 2 Enterprise Edition Connector Architecture (J2EE CA) specification specifies a mechanism by which a conforming Enterprise Information System (EIS) connector may be embedded in a container (such as a web/application server). The services of the connector are available to applications executing within that container. J2EE CA specifies a required contract between the connector and the container for managing resource pooling, transactions and security. J2EE CA also specifies a Common Client Interface (CCI) for client interaction with the connector, which the connector may choose to implement.

The (optional) J2EE CA specified Common Client Interface (CCI) attempts to define a unified interaction model across disparate EISs. A connector is a low-level protocol bridge to a specific EIS. A J2EE CA-compliant connector that chooses to implement CCI exposes only this basic 'protocol-level' functionality to the caller. The connector functionality is semantically equivalent to the functionality of the low-level client library that will typically be embedded inside the connector. Specifically:

- high-level functions explicitly defined in the EIS may be mapped to one call to the EIS, but the data representation will typically be untyped, not reflective of implied data structure, and extremely prone to inducing hard-to-detect caller programming errors.
- high-level functions implicitly defined in the EIS will typically map to multiple low-level calls to the EIS, thereby multiplying the problem outlined in above.

As such CCI by itself exposes no semantics relating to high-level functions which may be explicitly/implicitly defined on the EIS. If a J2EE CA connector were to model interaction with high-level functions (implicitly/explicitly defined) on the EIS, this would impose a requirement that the connector be aware and capable of executing such high-level function calls made directly on it. Which means that either the connector would be hardcoded for a fixed set of high-level functions, or that the connector developer would be responsible for implementing a general-purpose scheme for mapping an extendable set of high-level function calls to the internally-available low-level client-library API. The J2EE CA framework provides no means for the application developer to define/declare, discover, or introspect high-level functions as callable entities which map to a sequence of low-level calls to the specific EIS connector.

J2EE CA specifies an optional data representation for input/output, which may be reused across EIS. However, the data representation specified by J2EE CA is non-standard in the industry sense, and is thus unlikely to be adopted by connector providers. Moreover, even if the data representation specified by J2EE CA were adopted, this representation is not at all amenable to being transformed/mapped via declarative means such as XSL (Extensible Stylesheet Language (XSL) Translations).

Other prior art frameworks for uniformly modeling interaction with high-level functions (implicitly or explicitly defined) across disparate EIS also require that high-level function calls be hardcoded on the connector.

Java 2 Enterprise Edition Connector Architecture (J2EE CA) solves one level of problems by allowing a connector to an external EIS to reside within a container. J2EE CA provides a connector to only the low-level functions of the EIS. The J2EE CA specification does not create a design space for modeling high-level functions for a J2EE CA connector. In J2EE CA, the only way to model high-level functions is by hardcoding the functions in the connector. This model is not suitable to modeling high-level business functions that are not known at the time the connector is implemented. As a result, a user has to know how to sequence low-level functions together to perform a desired high-level function. Thus, J2EE CA presents a low level of abstraction to the developer. For ease of use, developers would like to see a higher level of abstraction than is provided by J2EE CA. The EAI framework as described herein provides this higher level of abstraction on top of J2EE CA connectors.

A J2EE CA Service Provider Interface (SPI) implementation may assist the connector developer in developing and deploying J2EE CA-compliant connectors. The J2EE CA SPI implementation may adhere to connection pooling, transaction management and security management interfaces of J2EE CA. By doing so, off the shelf J2EE CA-compliant connectors may be plugged in, and the connector-provided interaction API may be exposed, as is. Since the connector specification does not mandate CCI to be the client interaction API, this is sufficient to be J2EE CA compliant. The J2EE CA SPI implementation may allocate, match and deallocate connections from the connection pool (s). The J2EE CA SPI implementation may also perform caller principal-to-resource principal mapping. The J2EE CA SPI implementation may also enlist/de-list the EIS connections with the transaction managers based on a J2EE application transaction scope and connector-declared transaction participating ability. The J2EE CA SPI implementation may also allow a container (e.g. an Enterprise Java-Beans (EJB) container) to perform connection sharing and other optimizations.

As an example of using a J2EE CA connector, consider a banking enterprise system including an SAP system that hosts one or more high-level functions which are "unknown" or not exposed to the banking enterprise system. The high-level functions provide access to a database of information hosted by the SAP system to which the banking enterprise wants to provide access for its employees and customers. A J2EE CA connector will give the programmer the ability to talk to the SAP system, but is not aware of, and does not provide access to, the high-level functions on the SAP system. These high-level functions reside within the SAP system and are not explicit in terms of being directly visible to any client library API. J2EE CA does not provide a design space by which these functions can be modeled and dropped into a connector.

It may be desirable to expose at least some high-level functions of back-end systems such as EIS as loosely-coupled services. A loosely-coupled service is a service that is external to the container serving as a front-end. It may also be desirable to expose these high-level functions to tightly-coupled and loosely-coupled clients. A tightly-coupled client is a client that executes in the same container as the connector. A loosely-coupled client is one that is external to the container. However, a J2EE CA connector is usable only by tightly coupled clients because a sequence of low-level calls must happen on the same connection to the EIS in order to perform a high-level action in a consistent manner. A sequence of low-level calls are related by state in the sense that the sequence of low-level calls must happen on the same connection to the EIS in order to perform a high-level action in a consistent manner. If these low level calls originate from a loosely-coupled client (e.g. through a web service), then the calls cannot be associated by state because web service technologies are stateless. For example, if low-level calls L1, L2, L3 are made using a remote web service, it is not guaranteed that the calls go across the same connection. There may be guaranteed sequence/order, but the association of state will not be guaranteed. Thus, it is desirable to provide a framework in which high-level calls consisting of a sequence of low-level calls may be made to an EIS loosely-coupled to a container via a connector from a client loosely coupled to the container via a service such as a web service.

SUMMARY OF THE INVENTION

A system and method for providing a metadata-aware Enterprise Application Integration (EAI) framework for an application server environment is described. The metadata-aware EAI framework allows the connector writer to connect to a system using a low-level API. The framework provides a space in a connector where the user can define high-level functions. Using the framework, the user can mine the metadata for the functions and generate a description of the high-level function which can then be dropped into the framework and appear as a high-level function, invokable through the connector, to the developer. This high-level function manifestation, when invoked, will drive the low-level API provided by the connector.

An adaptive layer is described that may wrap a native Common Client Interface (CCI) exposed by a connector, for example a J2EE CA connector. This creates an abstract connector that allows a higher-level abstraction of external Enterprise Information Systems (EIS). The adaptive layer may interpret metadata to model an external EIS as a logical data source. Metadata may include implicit and explicit high-level EIS functions. In one embodiment, the adaptive layer may sit atop, and add value to, the Java 2 Enterprise Edition Connector Architecture (J2EE CA). The adaptive layer may be referred to as a metadata-aware CCI adapter.

The metadata-aware EAI framework may provide a uniform API to interact with metadata-aware CCI adapters. Thus, using the EAI framework, application developers may learn and use a single API to interact with a wide variety of connectors. Since the framework provides a single API and connector-specific formats (e.g. Protocol XML definitions and transformations) are stored as metadata, an application developer may to switch to a different connector by modifying the metadata contents and typically without requiring the modification of application code.

The metadata-aware CCI adapter may intercept an incoming high-level function call. The high-level function call may be comprised in a data object that may include a document, for example an XML document. In one embodiment, the document may be in a high-level XML dialect. A sequence of transformations may then be performed on the input data object as per one or more metadata definitions of the function call. The sequence of transformations may result in a secondary data object which may include an action flow of connector-level invocations expressed in a flow language and a list of connector-level CCI invocations referenced by the action flow.

The action flow expressed in the secondary data object may then drive a sequence of CCI invocations on the underlying connector under control of a sequencer. Results from these invocations may be stored in a tertiary 'results' data object. A series of transformations may be performed on the 'results' data object to yield an output data object that may be returned to the caller.

In one embodiment, the flow language may be manifested as a specific dialect of XML. The flow directives may model logic semantics of a conventional flowchart. The flow directives may include condition evaluation directives, which may refer to elements in the input and results data objects. Therefore, the sequence of executed actions may be predicated on the results of previously executed actions. Action directives in the flow language may accept parameters, which may replace arguments in the input to the connector-level action. Such parameters may refer to elements in the input and results data objects. Therefore, input to connector-level actions may be parameterized by the results of previously executed actions.

Figure 1:
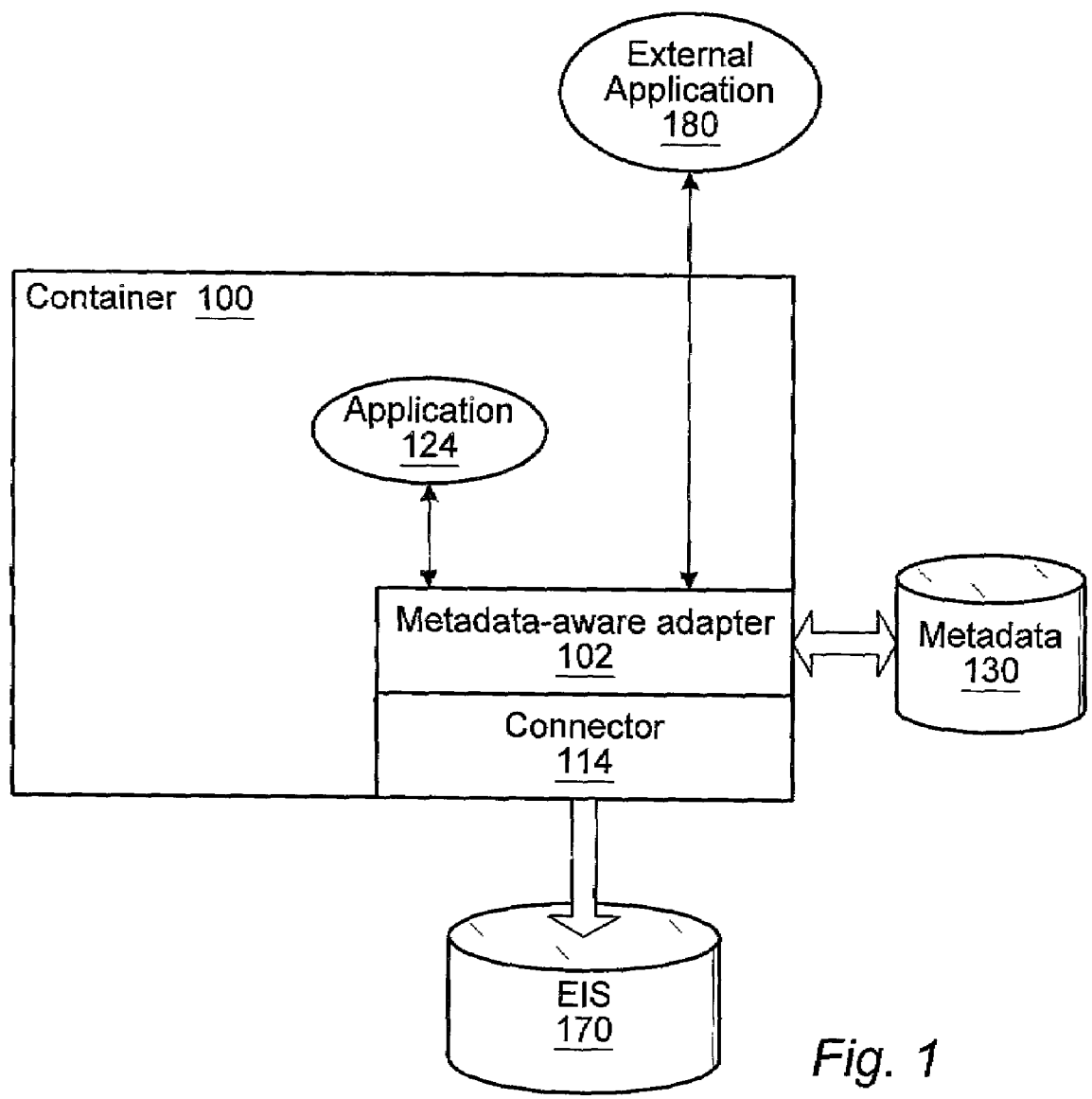
FIG. 1 is a block diagram illustrating the architecture of a metadata-aware Enterprise Application Integration (EAI) framework according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

A system and method for providing a metadata-aware Enterprise Application Integration (EAI) framework for an application server environment is described. The metadata-aware EAI framework provides a uniform, extensible and standards oriented manner, to extend an application server platform and deliver significant value in the integration space. The metadata-aware EAI framework may unify an application's interaction model and Applications Programming Interface (API) with external applications/systems. The metadata-aware EAI framework allows the connector writer to develop a connector to connect to a system using a low-level API. The framework provides a space in a connector where the high-level functions may be defined. Using the framework, metadata may be mined for the functions to generate a description of the high-level function which can then be dropped into the framework and appear as a high-level function, invokable through the connector. This high-level function manifestation, when invoked, will drive the low-level API provided by the connector (e.g. J2EE CA connector) to the external application/system.

An adaptive layer is described that may wrap a native Common Client Interface (CCI) exposed by a connector, for example a J2EE CA connector. This creates an abstract connector that allows a higher-level abstraction of external Enterprise Information Systems (EIS). Each EIS instance and its available high-level functions may be modeled as a discoverable and introspectable logical data source (as opposed to a physical data source) in a metadata repository. The adaptive layer may interpret metadata to access an external EIS as a logical data source. Metadata may include implicit and explicit high-level EIS functions. EIS data source configuration and administration may be standardized via metadata contents. The adaptive layer may be referred to as a metadata-aware CCI adapter.

In one embodiment, the metadata-aware EAI framework may provide a single, uniform API to interact with metadata-aware CCI adapters. In this embodiment, using the EAI framework, application developers may learn and use the single, uniform API to interact with a wide variety of connectors. Since the framework provides a single API and connector-specific formats (e.g. Protocol XML definitions and transformations) are stored as metadata, an application developer may to switch to a different connector by modifying the metadata contents, typically without requiring the modification of application code.

In one embodiment, each different connector may provide an API to the connector that specifies low-level function calls to the particular connector. The metadata may include one or more high-level function call definitions that each may map a high-level function call to the external system (e.g. EIS) to a series of low-level function calls to a particular connector. If an application developer wishes to switch from one connector to a different connector to the external system, the one or more high-level function call definitions that map high-level function calls to the external system to series of low-level function calls to the connector may be modified to instead map the high-level function calls to the external system to series of low-level function calls to the different connector.

In one embodiment, the adaptive layer may sit atop, and add value to, the Java 2 Enterprise Edition Connector Architecture (J2EE CA). The metadata-aware EAI framework may be built around existing connectors (e.g. J2EE CA connectors) to allow a metadata representation of high-level functions to be created that can be called with a single call from a client. The metadata-aware EAI framework allows high-level functions of the EIS to be exposed as directly callable entities on the calling application side via the uniform interaction model and API. The high-level functions may be explicitly or implicitly defined on the EIS. An explicitly defined function is executable via a single call to the EIS. An implicitly defined function may require multiple calls to the EIS to complete execution. Thus, the metadata-aware EAI framework allows the application developer to define/declare, discover, and introspect high-level functions as callable entities that may map to a sequence of low-level calls to the specific EIS connector. Such mappings may be defined using a declarative (no coding) methodology.

In one embodiment, the metadata-aware EAI framework may provide a uniform data representation capable of representing input/output to/from EIS data sources. Such representation may be structured, type-aware, introspectable, capable of representing content types, including content types other than text, and natively capable of containing XML. In one embodiment, the data representation may also be capable of representing all content as per MIME-type conventions. In one embodiment, the data representation may be transformable using mechanisms such as XSLT (Extensible Stylesheet Language (XSL) Transformations).

In order for loosely-coupled clients to be able to invoke high-level functions through a service such as a web service, the sequence of low-level calls may be encapsulated locally on the container including the connector. Abstracting a high-level function to have a single call for the high-level function and handling the sequencing within the metadata-aware CCI adapter allows the high-level function call to be invoked by both tightly-coupled and loosely-coupled clients of the container including the connector. The calls may be tied together on the container including the connector through the metadata-aware CCI adapter. In one embodiment, the metadata-aware CCI adapter may be external to the connector. In another embodiment, the metadata-aware CCI adapter may be integrated in the connector. External metadata-aware CCI adapters may be tightly coupled to the connector. If the high-level function is remotely called (called by a loosely-coupled client), one call (the high-level function call) is received on the container through the service (e.g. web service). The metadata-aware CCI adapter drives the connector to insure any sequence of low-level calls go across the same connection, thus guaranteeing association of state.

Because the metadata-aware CCI adapter provides high-level function calls to the EIS, an EIS connector writer may focus on exposing low-level interaction semantics with the EIS and not have to deal with modeling high-level functions implicit/explicit on the EIS. The connector may serve as a protocol/wire-format bridge.

FIG. 1 is a block diagram illustrating the architecture of a metadata-aware Enterprise Application Integration (EAI) framework according to one embodiment. An enterprise system may include a container 100, one or more EIS 170, one or more metadata repositories 130, and one or more external applications 180. In one embodiment, container 100 may be an application server. In one embodiment, container 100 may be a JVM. Container 100 may include one or more internal applications 124 and one or more connectors 114, with each connector 114 serving as an interface to one EIS 170. Each connector 114 may have an associated metadata-aware adapter 102. The metadata-aware adapter 102 may be external but tightly coupled to the connector 114. Alternatively, the metadata-aware adapter 102 may be integrated in the connector 114. Each metadata-aware adapter 102 may interface with a metadata repository 130. Metadata associated with the set of high-level functions provided by the EIS 170 may be stored in the metadata repository 130. The metadata in the repository 130 may model the EIS 170 as a logical data source. The metadata may include, but is not limited to, input/output type definitions (reusable across data sources), transformation definitions (reusable across data sources), and logical data source and function definitions for the EIS 170 associated with the connector 114.

In one embodiment, the metadata repository 130 may be kept in a persistent store, for example using JNDI (Java Naming and Directory Interface). Keeping the metadata repository 130 in a persistent store may allow the metadata repository 130 may be available to the user at runtime in both managed and unmanaged environments. A managed environment is one in which several mechanisms and methods are used to manage network and other computing resources that are typically not used in an unmanaged environment. For example, a managed environment may include remote monitoring, automated routine tasks such as configurations and software upgrades, an asset management database, and off-hour handling of tasks that would otherwise interfere with productivity. In one embodiment, a user application may be moved from an unmanaged to a managed environment without repopulating the metadata repository 130.

An external application 180 or an internal application 124 may generate high-level function calls for an EIS 170. The metadata-aware adapter 102 may intercept the high-level calls. The metadata-aware adapter 102 may access the metadata for the EIS metadata repository 130 and use the metadata associated with the particular high-level function call to drive connector 114 to perform a sequence of low-level function calls to the EIS 170. In one embodiment, the high-level function call may include business data (e.g. business XML). The metadata-aware adapter 102 may use the metadata to transform the business data into protocol data (e.g. protocol XML).

The sequence of low-level function calls to the EIS 170 may direct the EIS 170 to perform the high-level function. The EIS 170 may return results of the high-level function to the connector 114. The metadata-aware adapter 102 may collect these results and use the metadata associated with the high-level function call to transform the results into a format suitable for the calling application. In one embodiment, the results of the high-level function call may include protocol data (e.g. protocol XML). The metadata-aware adapter 102 may use the metadata to transform the protocol data into business data (e.g. business XML). The results may then be returned to the calling (internal or external) application.

Figure 2:
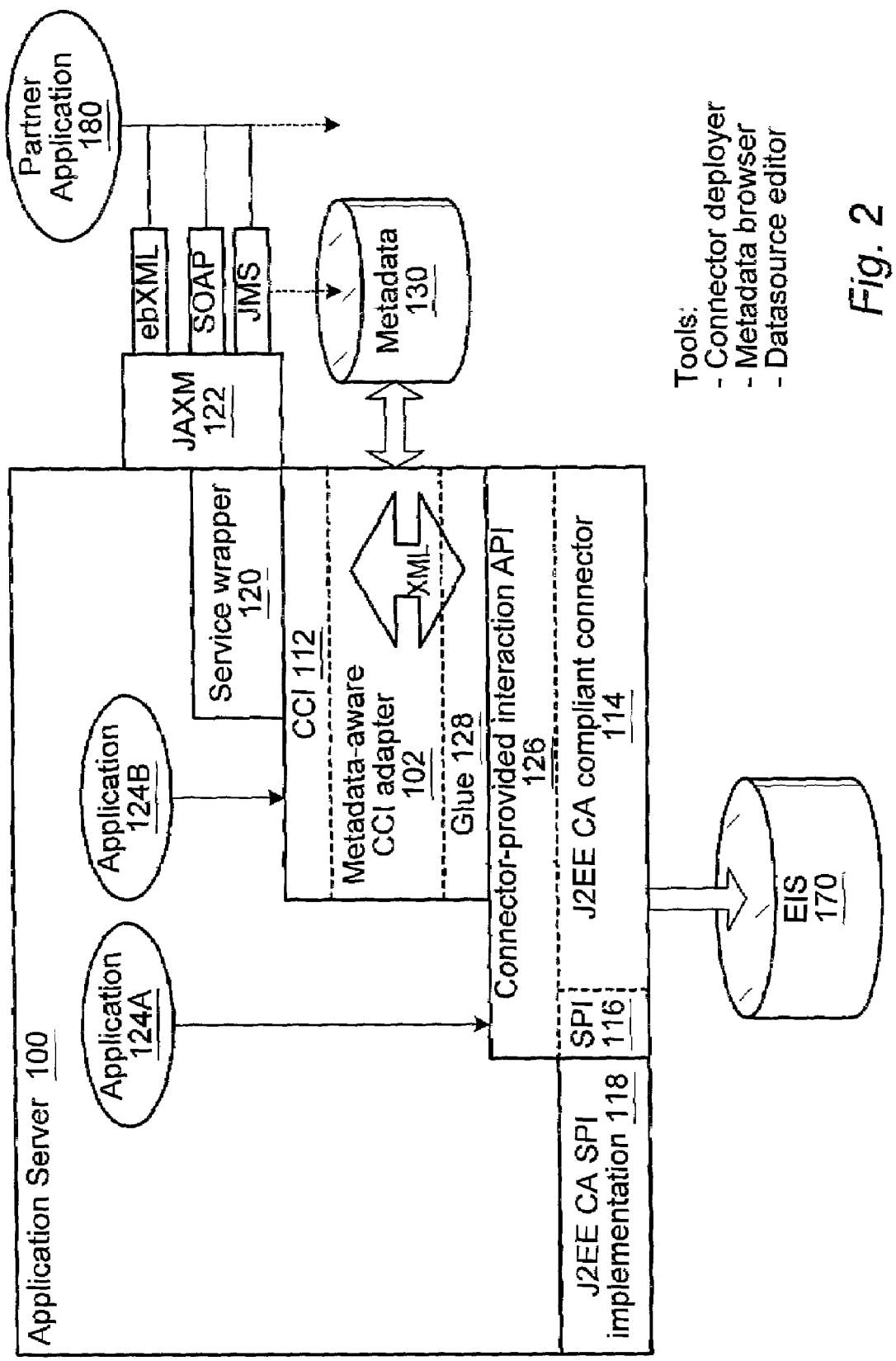
FIG. 2 is a block diagram further illustrating the architecture of a metadata-aware EAI framework according to one embodiment.

FIG. 2 is a block diagram further illustrating the architecture of a metadata-aware Enterprise Application Integration (EAI) framework according to one embodiment. In this embodiment, the EAI framework may be fully compliant with the J2EE CA. Common Client Interface (CCI) 112 may be described as a set of interfaces representing application interaction with the connector 114. Service Provider Interface (SPI) 116 may be described as a set of interfaces representing connector 114 interactions with the application server 100. The term "interaction specification" as used herein may be defined as a business method or an EIS function available on the EIS system 170. The term "record" as used herein may be defined as input or output data values for executing an interaction specification. The term "interaction" as used herein may be defined as the scope under which an application 124 executes one or more interaction specifications. A deployment descriptor may include the deployment information of a given connector 114.

When a J2EE CA-compliant connector 114 is plugged into a managed environment, it expects the Service Provider Interface (SPI) implementation 118 to be available. The SPI implementation 118 may provide one or more of connection management services, transaction management services, and security management services. In one embodiment, the SPI implementation 118 may be a J2EE CA SPI implementation.

On metadata repository 130, EIS instances may be represented as data sources. A metadata repository 130 may include the definitions of connection specifications, interactions, interaction specifications and records. EIS business methods may be selectively represented as interaction specifications. A metadata repository 130 may provide declarative means to plug in connector-specific transformations. Transformations may be specified as XSLT (Extensible Stylesheet Language (XSL) Transformations) scripts, as custom classes, or with other methods. The data sources may be deployed across two or more machines. In one embodiment, metadata repository 130 contents may be imported/exported as XML. Metadata repository 130 provides to developers a comprehensive view of the data sources to interact with. Applications may be developed in accordance with the exposed interaction specifications.

An implementation of a metadata-aware CCI adapter 102 may provide unified CCI (e.g. J2EE CA-suggested CCI) for client interaction across disparate connectors 114. Adaptor 102 may also provide an in-memory, hierarchical data representation object for interaction. Adaptor 102 may be metadata-aware and may interact with the metadata repository 130 to get the definitions of connection specifications, interactions, interaction specifications, records, etc. Adaptor 102 may pre-create instances as per the definitions retrieved from the metadata repository 130. Adaptor 102 may also interact with XML-aware CCI glue 128, which may be implemented on top of the connector 114. Alternatively, connector 114 may implement XML-aware CCI, and in this case glue 128 is not needed.

CCI adapter 102 may allow the use of CCI inside J2EE components, thereby taking advantage of the declarative transactional, security, concurrency and replication features of J2EE containers. CCI adapter 102 may provide a unified representation of interaction specifications definitions across connectors 114. Records may be prepared for interaction based on interaction specification definitions. In-memory representations of records may allow for easy population and manipulation and may be unified across connectors 114.

Service wrapper 120 may serve as a generic service wrapper for all connectors 114. Service wrapper 120 may seamlessly expose CCI connectors as XML-driven services. Service wrapper 120 may help enable loosely coupled (distributed) access to enterprise systems. The client may see no difference between a service that drives an enterprise system and any other service. Service wrapper 120 may be accessible using various protocols, such as HTTP, HTTPS, etc.

One embodiment may include a connector deployer tool that may be used to deploy connectors 114 (e.g. J2EE CA-compliant connectors) onto application servers 100. One embodiment may include a data source editor that may be a generic tool to create/edit/delete data sources, interactions, interaction specifications, records, etc.

One embodiment of the CCI adapter 102 may use XML as the data representation language. XML provides a uniform, hierarchical, standard, and accepted representation of data. When EIS business functions are exposed as services, the data representation for interaction is XML. This facilitates the development of services. Other embodiments may use other data representation languages.

One embodiment of the CCI adapter 102 allows the application to see a business representation (e.g. Business XML) rather than a protocol representation (e.g. Protocol XML). The Business XML represents a business method on the EIS. Protocol XML represents a protocol level data representation, for interaction with the EIS. The following two documents are examples of Business XML and Protocol XML documents and are not meant to be limiting in any way:

---
Business XML

```
<Address>
    <StreetNum>888</StreetNum>
    <StreetName>Broadway</StreetName>
    <City>Somewhere</City>
    <State>FL</State>
    <Zip>87654</Zip>
    <PhoneNumber>
        <AreaCode>222</AreaCode>
        <Exchange>333</Exchange>
        <Number>4444</Number>
    </PhoneNumber>
</Address>
```
---

---
Protocol XML

```
<Struct name="Address" >
    <int name="StreetNum" value="888"/>
    <String name="StreetName" value="Broadway"/>
    <String name="City" value="Somewhere"/>
    <String name="State" value="FL"/>
    <int name="Zip" value="87654"/>
    <Struct name="Phonebook">
        <int name="AreaCode" value="222"/>
        <int name="Exchange" value="333"/>
        <int name="Number" value="4444"/>
    </Struct>
</Struct>
```
---

In one embodiment of the EAI framework, Business XML is separated from Protocol XML. This allows:

- Application developers to program against the more logical and meaningful Business XML rather than very highly decorated Protocol XML
- The connector developer to concentrate on building a protocol bridge between Protocol XML and the EIS API
- Services and more value added layers to be developed on top, using Business XML
- The exposure of the Business XML to partner interaction etc, through services or custom coded webfronts (e.g. Servlets, JSPs, etc.)

The EAI framework may allow transformations for converting a Business XML document to a Protocol XML document to be plugged in. The EAI framework may provide self-describing, lightweight and performant unified in-memory data representation of a record (e.g. XML-Record). The EAI framework may also allow an application developer to get desired representations of a record (e.g. XMLRecord) for manipulation. In addition to DOM and SAX, an application developer may use self-describing, lightweight and performant data representation for XML population and manipulation. Other embodiments may support other pluggable representations such as Java Architecture for XML Binding (JAXB).

Figure 3:
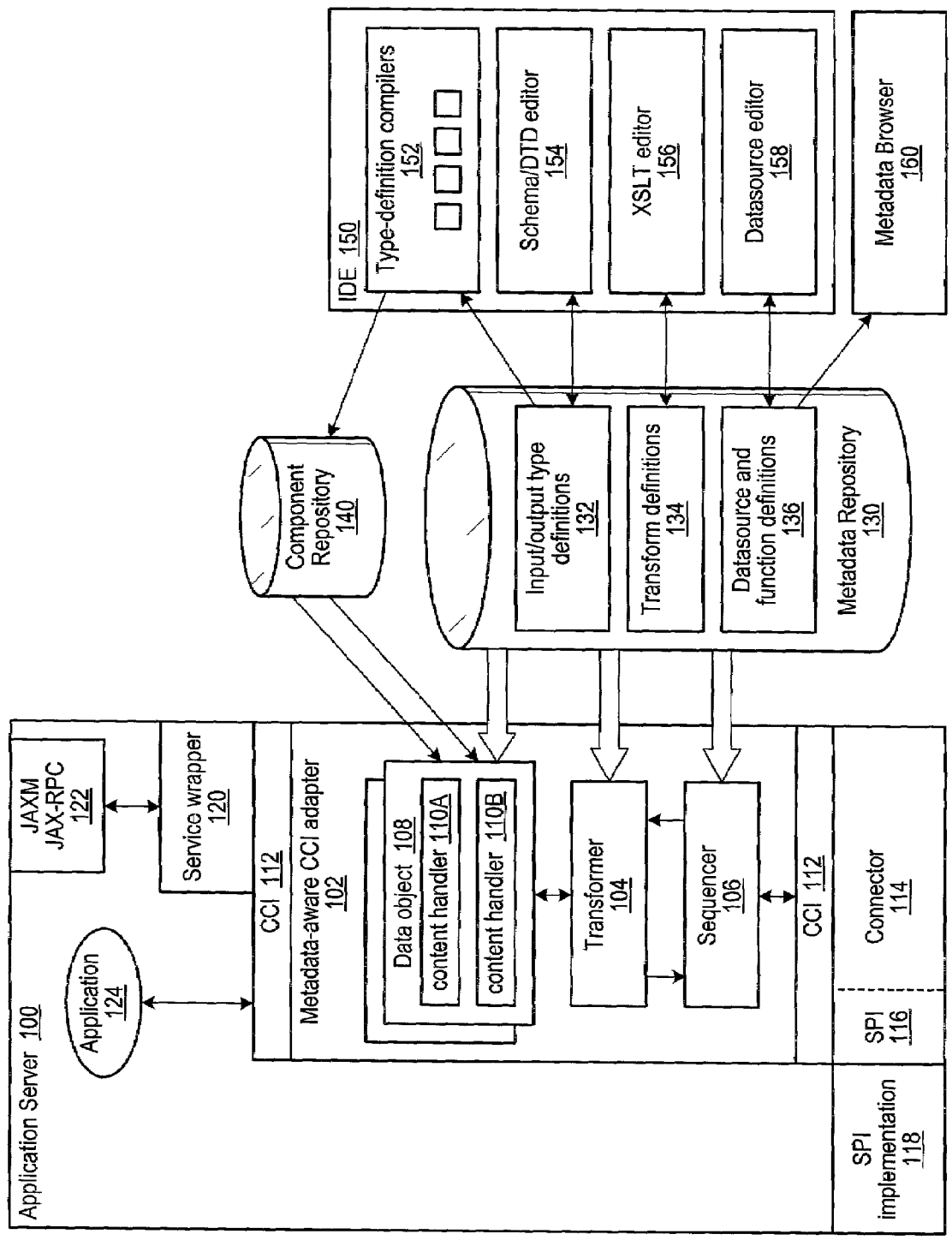
FIG. 3 is a block diagram illustrating the architecture of a development environment operable to generate metadata for use by a metadata-aware adapter/connector in performing high-level function calls to an EIS and further illustrating aspects of a metadata-aware EAI framework according to one embodiment.

FIG. 3 is a block diagram illustrating a development environment operable to generate metadata for use by a metadata-aware adapter/connector in performing high-level function calls to an EIS according to one embodiment. FIG. 3 also further illustrates aspects of the metadata-aware Enterprise Application Integration (EAI) framework according to one embodiment. This diagram shows an Integrated Development Environment (IDE) 150 coupled to the container (application server 100). A connector developer may supply a connector 114 to one or more Enterprise Information Systems (EIS). In one embodiment, connector 114 may be J2EE CA-compliant. In one embodiment, connector 114 may be supported by the container (e.g. application server 100) within which it resides via a SPI (Service Provider Interface) contract. In one embodiment, the SPI contract may be J2EE CA-specified. Service Provider Interface (SPI) 116 may be defined as a set of interfaces representing connector 114 interaction with the application server 100. When a connector 114 is plugged into a managed environment, it may require a Service Provider Interface (SPI) implementation 118 to be available. The SPI implementation 118 may provide one or more of connection management services, transaction management services, and security management services. In one embodiment, the SPI implementation 118 may be a J2EE CA SPI implementation.

Common Client Interface (CCI) 112 may be described as a set of interfaces representing application interaction with the connector 114. In one embodiment, the connector may implement a CCI as specified in J2EE CA. Alternatively, "glue" may used to implement a CCI. An adaptive layer 102 may wrap the native CCI API 112 exposed by the connector 114. The adaptive layer may be referred to as a metadata-aware CCI adapter 102. The adaptive layer 102 may interpret metadata in the metadata repository 130 to model an EIS as logical data source. The adaptive layer 102 may allow a caller to interact with the underlying EIS instance via high-level functions, by mapping them to a flow of one or more calls on the underlying connector 114.

In one embodiment, the metadata-aware CCI adapter 102 may expose to the caller a J2EE CA-compliant CCI interface. The metadata-aware CCI adapter 102 may model an EIS as a logical data source with multiple callable high-level functions. The metadata-aware CCI adapter 102 may intercept all calls to the EIS, interpret metadata, and map them to a flow of one or more calls to the underlying connector 114. Thus, the metadata-aware CCI adapter 102 provides application developers with a metadata-aware uniform CCI as specified by J2EE CA, thereby delivering the value of the Unified Integration Framework (UIF). In one embodiment, the CCI may be XML-aware, enabling quick development of connectors.

Metadata may be stored in the metadata repository 130. In one embodiment, the metadata repository 130 may be modeled atop a JNDI (Java Naming and Directory Interface) namespace, and access may be via a JNDI service provider. The metadata repository 130 may include, but is not limited to, input/output type definitions 132 (reusable across data sources), transformation definitions 134 (reusable across data sources), and logical data source and function definitions 136.

Data may be modeled via a data object implementation 108, a container for multiple content parts. A data object implementation 108 may be agnostic about the content type of its parts, and may allow all content to be represented as per MIME (Multi-Purpose Internet Mail Extensions)-type conventions.

In one embodiment, input/output type definitions 132 may be stored as Extensible Markup Language (XML) schema and/or XML DTD (Data Type Definitions) (or references to them). Other embodiments may use other schema languages and definitions for input/output type definitions 132. In one embodiment, transformation definitions 134 may be stored as XSLT (Extensible Stylesheet Language (XSL) Transformations) scripts or alternatively as Java classes implementing a transformation interface (or references to a transformation interface). Other embodiments may use other methods for storing transformation definitions 134. In one embodiment, logical data source definitions 136 may be stored as a namespace hierarchy of XML fragments which may define attributes of the data source (e.g. pooling, transactions, security constraints and mappings), and a set of callable high-level function definitions. Other embodiments may use other schema languages for logical data source definitions 136. Each high-level function definition may include one or more attributes of the function including, but not limited to:
  security constraints;
  input type definition (or reference);
  output type definition (or reference);
  sequence of input transforms (or references);
  sequence of output transforms (or references); and
  initializers for secondary data object(s).

In one embodiment, an Integrated Development Environment (IDE) 150 for editing and browsing input/output type definitions, transformation definitions, and data source definitions may be provided. In one embodiment, the IDE framework 150 may include one or more tools including, but not limited to:
  An editor for defining XML schema/DTD type definitions 154
  An editor for defining and debugging XSLT scripts 156
  An editor for defining logical data sources and high-level functions 158
  One or more pluggable type definition compilers 152 for XML type definitions. These compilers may consume XML schema/DTD definitions and generate components/classes for runtime use by XML content-type handlers. The compilers may be differentiated by an XML encoding scheme (such as SOAP (Simple Object Access Protocol) encoding, JAXB (Java Architecture for XML Binding) encoding, or other custom encoding schemes).

One embodiment may include a metadata browser 160 for browsing metadata in the metadata repository 130. In one embodiment, the metadata browser may be used to browse, import, and export metadata. In one embodiment, the metadata browser 160 may be implemented as a web client. In one embodiment, the browser 160 may be a rich web client (as opposed to a thin web client).

A transformer 104 and a sequencer 106 component may be embedded in the metadata-aware CCI adapter 102. These components may be responsible for driving the flow of actions as described in FIG. 4 below. In one embodiment, the flow language/flow engine of the sequencer 106 operates on a script (e.g. XML script).

In one embodiment, data may be modeled via a data object implementation. Note that data objects 108 are not components of the adapter 102 but are transitory data objects that may be created and destroyed. A data object 108 may include multiple content parts. A data object 108 may be agnostic about the content type of its parts, and may allow all content to be represented as per MIME-type conventions. A data object 108 may implement one or more algorithms that may eliminate unnecessary conversions between representations for the same content.

A data object 108 may natively support an API for accessing and manipulating content parts. The API may provide support for plugging in type-specific content handlers 110. The content handlers 110 may provide type-specific in-memory representations of content parts. Developers may choose to deal with a content part using a content-specific interface. For example, a programmer may interact with an XML part as a DOM (Document Object Model) tree, a SAX (Simple API for XML) event generator, and/or a JAXB (Java Architecture for XML Binding) object graph. The same part may be manipulated in different forms at different times.

A data object 108 may natively provide content-type handlers (e.g. XML content-type handlers) for multiple in-memory representations such as SAX, DOM, JDOM (Java DOM), and object-value-graphs such as JAXB. Object-value-graph handlers may be differentiated by XML encoding scheme (such as SOAP encoding, JAXB encoding, or other custom encoding schemes). Handlers may require runtime components derived from input/output type definitions. In one embodiment such components may be generated by compiling schemas/DTD (e.g. XML schemas/DTD) at definition time, and may be stored in an appropriate class/component repository.

A data object 108 may be capable of automatically instantiating a content part (e.g. XML content part) as per its underlying input/output schema/DTD definition.

A data object 108 may be responsible for consistency and keeping multiple content representations synchronized with part content. To avoid repeated parsing by content handlers, the data object 108 may support reuse of already instantiated representations so long as the message remains in-process or another handler on the same part updates content. In one embodiment, the data object 108 may defer synchronizing part content with representations until the last possible moment (e.g. when the message is marshaled).

The service wrapper 120 (e.g. web service wrapper) may be defined as a single generic component that allows high-level functions on EIS to be invoked as a service (e.g. web service). In one embodiment, the service wrapper 120 may receive requests via JAXM (Java APIs for XML Messaging), JAX-RPC (Java API for XML-based Remote Procedure Call) or other 'loosely coupled' invocation mechanisms. The request may include directives addressing a specific data source and high-level function. The request payload may be treated as input to the target function. The service wrapper 120 may execute the function via the metadata-aware CCI adapter 102 and return the result as payload in the response message of the service request.

Figure 4:
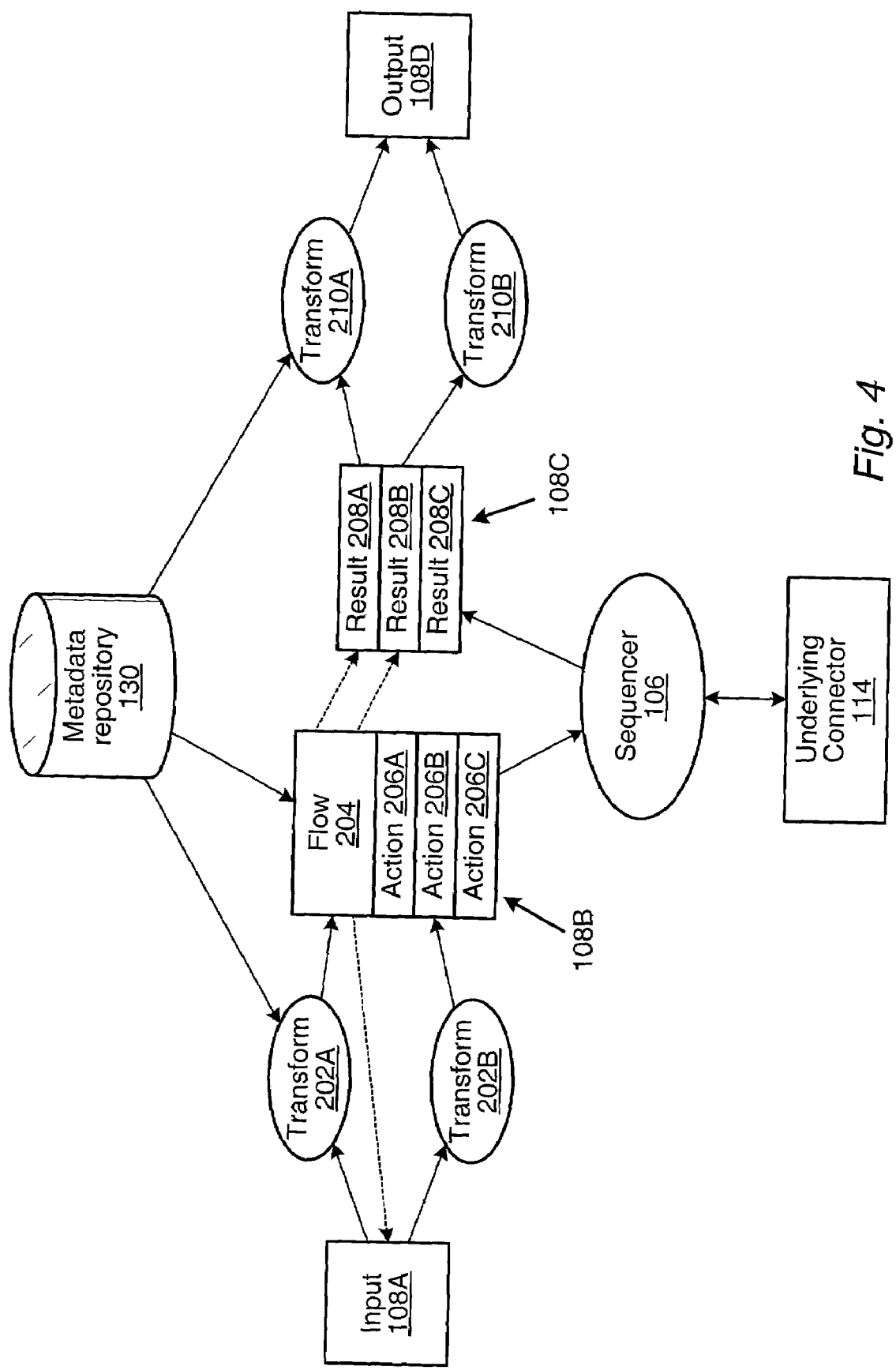
FIG. 4 illustrates data flow in a metadata-aware Enterprise Application Integration (EAI) framework according to one embodiment.

FIG. 4 illustrates data flow in a metadata-aware Enterprise Application Integration (EAI) framework according to one embodiment. The metadata-aware CCI adapter 102 may intercept an incoming high-level function call (input data object 108A). Input data object 108A may include a document, for example an XML document. In one embodiment, the document may be in a high-level dialect, for example a high-level XML dialect. Transformer 104 may then drive a sequence of transformations 202 on the input data object 108A as per one or more metadata definitions of the function call. The sequence of transformations 202 may result in a secondary data object 108B which may include an action flow 204 of connector-level invocations expressed in a flow language and a list of connector-level CCI invocations 206 referenced by flow 204.

The action flow 204 expressed in the secondary data object 108B may then drive a sequence of CCI invocations on the underlying connector 114 under control of sequencer 106. Results from these invocations may be stored in a tertiary 'results' data object 108C. Transformer 104 may then drive a sequence of transformations 210 on the 'results' data object 108C to yield a results (output) data object 108D that may be returned to the caller.

In one embodiment, the flow language may be manifested as a specific dialect of XML. The flow directives may model logic semantics of a conventional flowchart. The flow directives may include condition evaluation directives, which may refer to elements in the input and results data objects 108. Therefore, the sequence of executed actions may be predicated on the results of previously executed actions. Action directives in the flow language may accept parameters, which may replace arguments in the input to the connector-level action. Such parameters may refer to elements in the input and results data objects 108. Therefore, input to connector-level actions may be parameterized by the results of previously executed actions. The flow language may follow flow semantics to allow flow execution to be predicated on the results of previously executed actions, and to allow input to actions to be parameterized by the results of previously executed actions.

Figure 5:
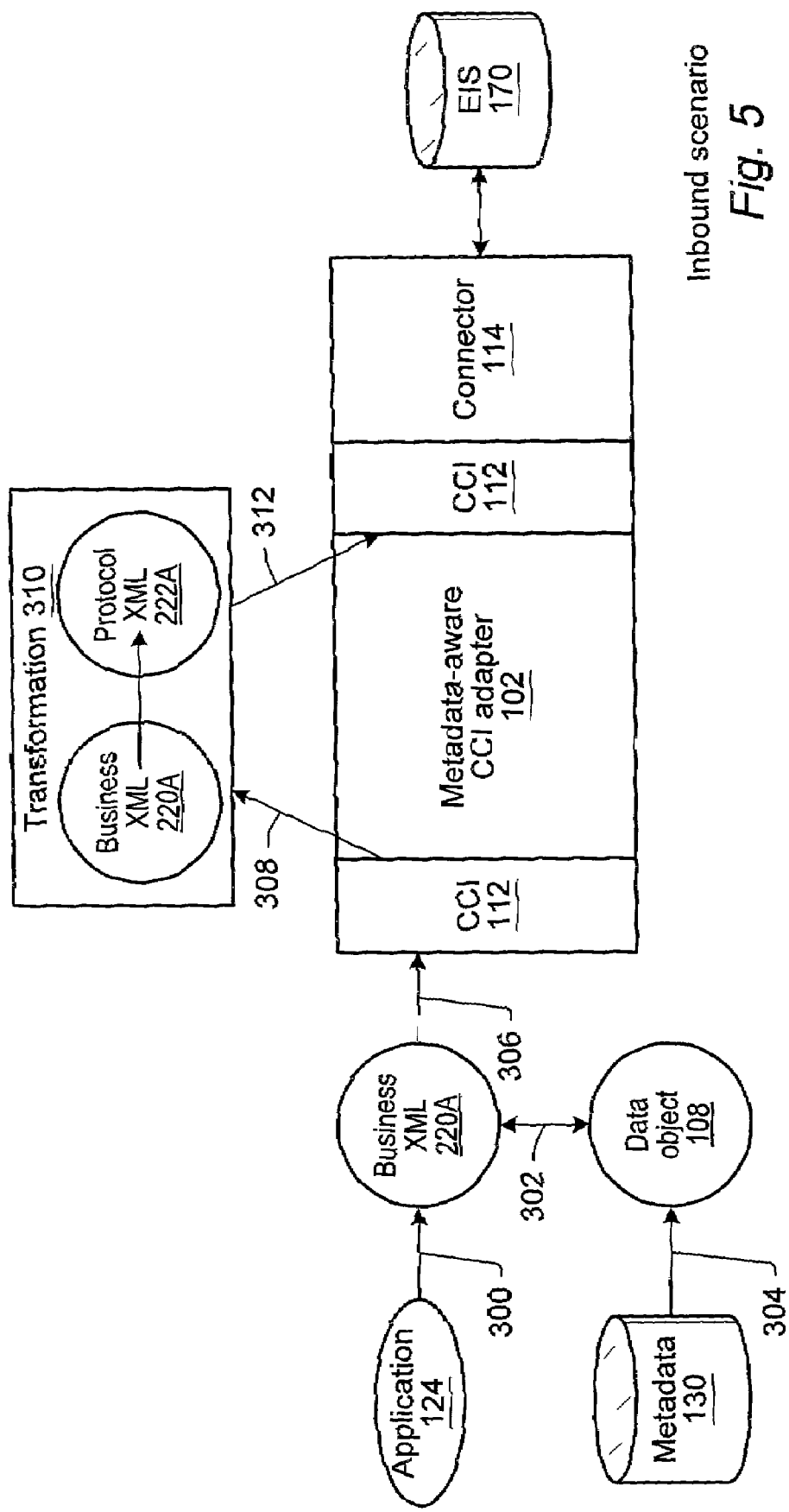
FIGS. 5 and 6 illustrate the interaction between an application, CCI adapter and connector according to one embodiment.
Figure 6:
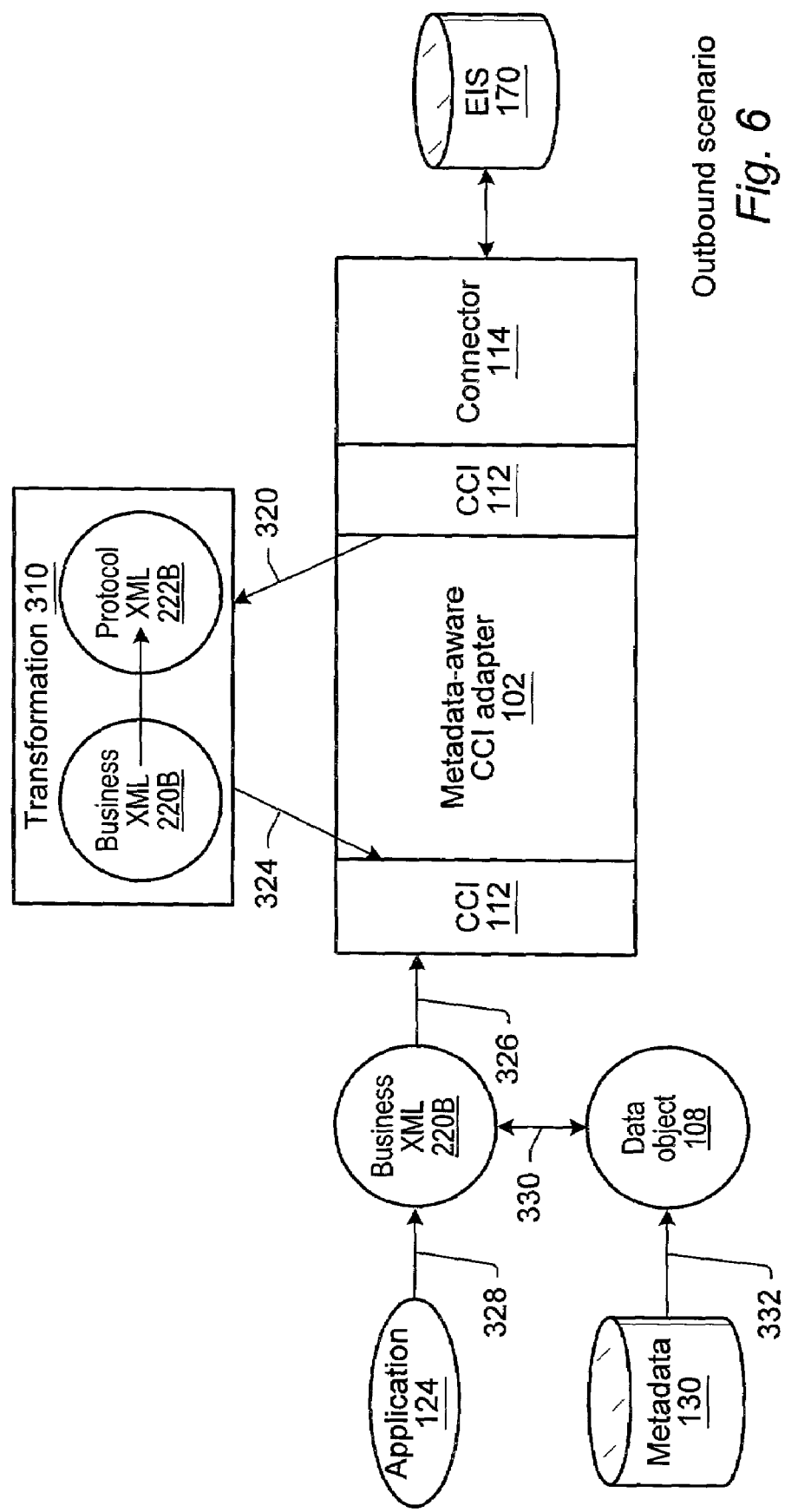

FIGS. 5 and 6 illustrate the interaction between an application, CCI adapter 102 and connector 114 according to one embodiment. FIG. 5 illustrates the inbound scenario and FIG. 6 illustrates the outbound scenario. The following Java method is an example of one way that this interaction may be programmed and is not intended to be limiting in any way. Program statements that correspond to elements of FIGS. 5 and 6 are so indicated:

```
public void ejbmethod( ){
    javax.naming.context nc = new InitialContext( );
    javax.resource.cci.ConnectionFactory cf =
    (ConnectionFactory)
    nc.lookup("java:comp/env/eis/ConnectionFactory");
    javax.resource.cci.Connection cx = cf.getConnection( );
    javax.resource.cci.Interaction ix = cx.CreateInteraction( );
    com.iplanet.cci.interaction specificationImpl ixspec =
    new interaction specificationImpl("<interaction specification
    name>");
    /** 300 of FIG. 5 **/
    com.iplanet.cci.XMLRecord input = ixspec.getInputRecord( );
    /** 302 of FIG. 5 **/
    com.iplanet.Data object do = input.getRepresentation("DO");
    /** 304 of FIG. 5 **/
    do.setAttrString("SearchName", new String("<val>");
    /** 306–312 of FIG. 5 and 320–328 of FIG. 6 **/
    com.iplanet.cci.XMLRecordXMLRecord output = ix.execute(ixSpec,
    input);
    /** 330 of FIG. 6 **/
    com.iplanet.Data object do2 = output.getRepresentation("DO");
    /** 332 of FIG. 6 **/
    String i = do2.getAttrNum("Address.StreetName");
    String s = do2.getAttrString("Address.StreetName");
}
```

A program may be developed in accordance with the metadata-aware CCI. As indicated at 300 of FIG. 5, a CCI call may be made to create an interaction specification object. A JNDI name may be supplied. The interaction specification definition may be retrieved from the JNDI source and the interaction specification may be pre-created. The input XMLRecord (business XML 220A) may be gotten from the interaction specification. The input XMLRecord may be created based on the definition available in the metadata. The XMLRecord may either be populated by setting the text XML as is, or a Data Object (DO) representation 108 may be retrieved as indicated at 302 and the XMLRecord may be manipulated using the DO representation as indicated at 304. In one embodiment, the DO may be marshaled and unmarshaled to and from XML.

As indicated at 306, the interaction specification and the input XMLRecord 220A may be passed to the metadata-aware CCI adapter 102 for execution. If the application is using DO representation, the metadata-aware CCI adapter 102 marshals the DO representation to XML with its associated XSD (XML Schema Definition) and calls the transformation plug-in 310 available in the metadata repository as indicated at 308. In one embodiment, just the Business XML is passed to transformer 310. In another embodiment, the Business Interaction Specification may be passed to transformer 210 as well. The output of the transformer 310 is handed over to the connector 114 for execution as indicated at 312. If a NULL transform is specified, the metadata-aware CCI adapter 102 hands over the input XMLRecord (Business XML 220A) as is to the connector CCI 112.

Referring now to FIG. 6, the connector 114 sends out the Protocol XML to the metadata-aware CCI adapter 102. The metadata-aware CCI adapter 102, as in the inbound scenario of FIG. 5, calls the corresponding transformer 310 to generate the Business XML 220B from the Protocol XML 222B and hands it back to the application. If NULL transformation is specified, the Protocol XML 22B may be delivered to application 124 as is. The Business XML response may be interpreted by the application either by parsing using DOM/SAX or by asking for the DO representation for traversal.

The following psuedocode snippet shows a typical service wrapper interaction with the metadata-aware CCI adapter 102 and underlying connectors 114 according to one embodiment. Service wrappers may be generated on top of the interaction specifications available in the metadata repository, as per users' choice. The service that is generated may register itself along with a property set containing the connector interaction information and the MIME/multipart message payload type definition. Once the service is invoked, it may receive the message and a handle to the property set. The pseudocode also illustrates an example of what the service wrapper may do with this information:

```
MIME/multi-part-message ServiceExecute (MIME/multi-part-message,
Propertyset)
{
    /* Manifest of the MIME/multipart message contains multiple
    interaction specification names and pointers to corresponding
    message parts*/
    /* Service property set contains the information on which connector
    to use to and derived caller principal details*/
    Read the manifest
    create a hash map of interaction specification and corresponding
        message part
    create an empty out going MIME/multi-part-message
    Read the property set to determine the connector to talk to, the
        connection, interaction specifications and the caller
        identity
    create connection based on property set values
    get Interaction from the connection
    for each (hash map entry){
        create interaction spec
        get the payload from the message part
        create XMLRecord out of payload
        execute using interaction specification and XMLRecord
        take the output XMLRecord and populate outgoing MIME/multi-
            part-message
    }
    return outgoing MIME/multi-part-message
}
```

In one embodiment, a single Business XML object may be transformed into multiple Protocol XML objects. For example, a 'SubmitOrder' Business XML may manifest itself into two EIS calls (for example SAP) like 'BAPI_UpdateOrder', 'BAPI_AddNotifyList' with different Protocol XMLs. In one embodiment, multiple Protocol XMLs may be transformed into a single Business XML. For example, in the above example, the response of both calls may be used to prepare a Business XML. In one embodiment, the connector may be driven with multiple Protocol XMLs. In one embodiment, multiple connectors may be driven with multiple Protocol XMLs.

Figure 7:
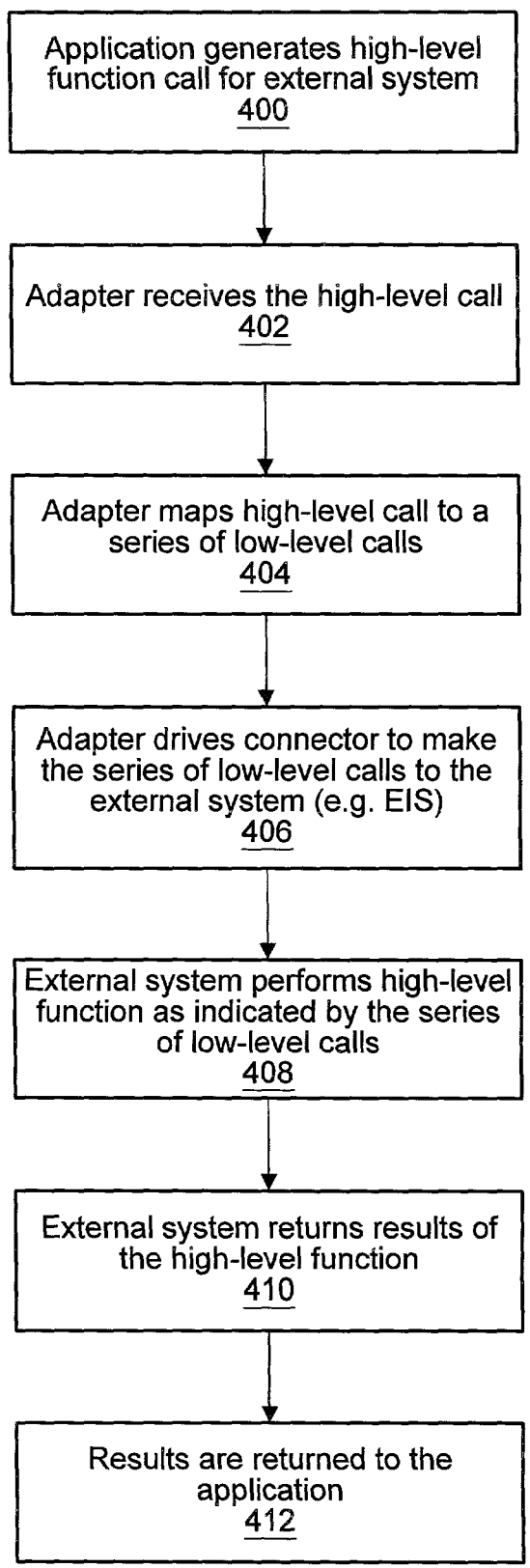
FIG. 7 is a flowchart illustrating a method of using a metadata-aware Enterprise Application Integration (EAI) framework in a container to map high-level functions generated by an application to a series of low-level functions for which an interface is provided through a connector to a system external to the container according to one embodiment.

FIG. 7 is a flowchart illustrating a method of using a metadata-aware Enterprise Application Integration (EAI) framework in a container (e.g. application server) to map high-level functions generated by an application to a series of low-level functions for which an interface is provided through a connector to a system (e.g. EIS) external to the container according to one embodiment. As indicated at 400, an application may first generate a high-level function call for the external system (e.g. EIS). The application may be tightly-coupled or loosely-coupled to the container in which the adapter/connector resides. In one embodiment, one or more high-level function calls may be exposed to the application through the metadata repository. In one embodiment, the application may discover the high-level function calls described in the metadata repository and provide an interface to the functions to the user to allow the user to select one or more of the high-level function calls for execution. In one embodiment, one or more high-level function calls may be executed by the program as part of normal execution flow of the program (i.e. not requiring direct user selection). The low-level implementation of the high-level call may be hidden from the calling application/user.

As indicated at 402, the adapter may receive the high-level call. The adapter may then map the high-level call to a series of low-level calls as indicated at 404. In one embodiment, the adapter may retrieve metadata associated with the high-level function call and use the metadata in transforming the high-level function call. In one embodiment, the high-level function call may be comprised in a data object, and the data object may be transformed from a business format (e.g. business XML) into a protocol format (e.g. protocol XML). The series of low-level function calls may then be used by the adapter to drive the connector to make the series of low-level calls to the external system (e.g. EIS) as indicated at 406. The external system may then execute the series of low-level calls to perform the high-level function as indicated at 408. Having the adapter drive the connector to perform the series of low-level function calls to the external system allows the low-level function calls to be made over the same connection to the external system, thus enabling loosely-coupled applications to make high-level calls.

As indicated at 410, the external system (e.g. EIS) may generate results of the high-level function call. Results of one or more of the low-level function calls may be generated as partial or intermediate results of the high-level function call. The results may then be returned to the application as indicated at 412. The results may be returned to the connector. In one embodiment, the results may be compiled into a results data object. The results data object may then be transformed into an output data object which is provided to the application. In one embodiment, metadata associated with the high-level function call may be used in the transformation of the results data object into the output data object. In one embodiment, the results data object may be transformed from a protocol format (e.g. protocol XML) into a business format (e.g. business XML).

The methods as described in FIG. 7 may be implemented in software, hardware, or a combination thereof. The order of method may be changed, and various steps may be added, reordered, combined, omitted, modified, etc.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc., as well as transmission media or signals such as electrical, electromagnetic, or digital signals, conveyed via a communication medium such as network and/or a wireless link.

In summary, a system and method for providing a metadata-aware Enterprise Application Integration (EAI) framework for an application server environment have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
an application sending to a container a data object specifying a high-level function provided by a system external to the application;
the container receiving the data object specifying the high-level function;
the container accessing metadata corresponding to the high-level function, wherein the metadata describes the high-level function of the external system;
the container performing one or more transformations on the data object specifying the high-level function in accordance with the metadata to produce a data object including information for driving a connector to the external system to make a plurality of low-level calls to the external system to perform the high-level function;
the container executing the data object including the information for driving the connector to the external system to drive the connector to make the plurality of low-level calls to the external system; and
the external system executing a plurality of low-level functions as specified by the plurality of low-level calls received from the connector, wherein said executing the plurality of low-level functions performs the high-level function of the external system.

2. The method as recited in claim 1, further comprising:
the container receiving results of said executing the plurality of low-level functions;
the container storing the results of said executing the plurality of low-level functions in a results data object;
the container performing one or more transformations on the results data object to generate an output data object, wherein the output data object includes the results of the high-level function; and
the container providing the output data object to the application.

3. The method as recited in claim 1, wherein the metadata is accessed from a metadata repository.

4. The method as recited in claim 3, wherein the metadata repository is in a persistent store that provides access to the metadata repository to applications within managed environments and applications within unmanaged environments.

5. The method as recited in claim 4, wherein the application is in an unmanaged environment, the method further comprising the application moving from the unmanaged environment to a managed environment, wherein said moving the application does not require repopulating the metadata repository.

6. The method as recited in claim 3, wherein the metadata repository is implemented in a Java Naming and Directory Interface (JNDI) namespace.

7. The method as recited in claim 1, further comprising, prior to sending the data object specifying the high-level function, the application accessing a metadata repository comprising information describing one or more high-level functions of the external system to discover the one or more high-level functions provided by the external system, wherein the specified high-level function is one of the one or more discovered high-level functions.

8. The method as recited in claim 1, further comprising, prior to the application sending the data object specifying the high-level function:
accessing a metadata repository comprising information describing one or more functions of the external system; and
generating the metadata corresponding to the high-level function from the information describing the one or more functions of the external system.

9. The method as recited in claim 1, wherein the application accesses the container in accordance with an Application Programming Interface (API) to the container.

10. The method as recited in claim 1, wherein the plurality of low-level function calls to the external system are specific to the connector, wherein said mapping the high-level function to a plurality of low-level function calls to the external system comprises the container accessing metadata corresponding to the high-level function, wherein the metadata maps the high-level function to the plurality of low-level function calls to the external system specific to the connector.

11. The method as recited in claim 10, further comprising modifying the metadata corresponding to the high-level function to map the high-level function to a plurality of low-level function calls to the external system specific to a different connector to the external system.

12. The method as recited in claim 1, wherein the application is comprised in the container.

13. The method as recited in claim 1, wherein the application is external to the container.

14. The method as recited in claim 1, wherein the connector is a Java 2 Enterprise Edition Connector Architecture (J2EE CA) connector.

15. The method as recited in claim 1, wherein the container is an application server.

16. The method as recited in claim 1, wherein the container is a Java Virtual Machine (JVM).

17. The method as recited in claim 1, wherein the external system is an Enterprise Information System (EIS).

18. A method comprising:
an application sending to an application server container a high-level function call corresponding to a high-level function of a system external to the application;
the application server container mapping the high-level function call to a series of low-level function calls to the external system;
the application server container driving a connector to the external system to make the series of low-level function calls to the external system; and
the external system executing the series of low-level functions as specified by the series of low-level function calls received from the connector, wherein said executing the series of low-level functions performs the high-level function of the external system corresponding to the high-level function call.

19. The method as recited in claim 18, wherein said mapping the high-level function call to a series of low-level function calls to the external system comprises:
the container accessing metadata corresponding to the high-level function call, wherein the metadata describes the high-level function of the external system, wherein the metadata is accessed from a metadata repository comprising metadata describing a plurality of high-level functions of the external system; and
the container performing one or more transformations on the high-level function call in accordance with the metadata to produce a data object, wherein the data object includes information for driving a connector to the EIS to make the series of low-level calls to the external system to perform the high-level function.

20. The method as recited in claim 18, wherein, prior to sending the high-level function call, the method further comprises the application accessing a metadata repository comprising metadata describing a plurality of high-level functions of the external system to discover one or more high-level functions provided by the external system, wherein the specified high-level function is one of the one or more discovered high-level functions.

21. The method as recited in claim 20, wherein the metadata repository is in a persistent store that provides access to the metadata repository to applications within managed environments and applications within unmanaged environments.

22. The method as recited in claim 20, wherein the application is in an unmanaged environment, the method further comprising the application moving from the unmanaged environment to a managed environment, wherein said moving the application does not require repopulating the metadata repository.

23. The method as recited in claim 20, wherein the metadata repository is implemented in a Java Naming and Directory Interface (JNDI) namespace.

24. The method as recited in claim 18, further comprising:
the container receiving results of said executing the plurality of low-level functions;
the container storing the results of said executing the plurality of low-level functions in a results data object;
the container performing one or more transformations on the results data object to generate an output data object, wherein the output data object includes the results of the high-level function; and
the container providing the output data object to the application.

25. The method as recited in claim 18, further comprising, prior to sending the high-level function call:
accessing a metadata repository comprising information describing one or more functions of the external system; and
generating a metadata description of the high-level function from the information describing the one or more functions of the external system;
wherein said mapping the high-level function call to a series of low-level function calls to the external system is performed in accordance with the metadata description of the high-level function.

26. The method as recited in claim 18, wherein the application accesses the container in accordance with an Application Programming Interface (API) to the container.

27. The method as recited in claim 18, wherein the container accesses the connector in accordance with a connector Application Programming Interface (API) to the connector, wherein the connector API defines each of the series of low-level function calls to the external system through the connector, wherein said mapping the high-level function call to a series of low-level function calls to the external system comprises the container accessing metadata corresponding to the high-level function call, wherein the metadata maps the high-level function call to the series of low-level function calls to the external system as defined by the connector API.

28. The method as recited in claim 27, further comprising modifying the metadata corresponding to the high-level function to map the high-level function call to a series of low-level function calls to the external system as defined by a connector API corresponding to a different connector to the external system.

29. The method as recited in claim 28, further comprising:
the application resending to the container the high-level function call corresponding to the high-level function of the external system;
the container accessing the metadata corresponding to the high-level function call to map the high-level function call to the series of low-level function calls to the external system as defined by the connector API to the different connector to the external system;
the container driving the different connector to the external system to make the series of low-level function calls to the external system as defined by the connector API to the different connector to the external system; and
the external system executing the series of low-level functions as specified by the series of low-level function calls received from the different connector, wherein said executing the series of low-level functions performs the high-level function of the external system corresponding to the high-level function call.

30. The method as recited in claim 18, wherein the connector is a Java 2 Enterprise Edition Connector Architecture (J2EE CA) connector.

31. The method as recited in claim 18, wherein the container is an application server.

32. The method as recited in claim 18, wherein the container is a Java Virtual Machine (JVM).

33. The method as recited in claim 18, wherein the external system is an Enterprise Information System (EIS).

34. The method as recited in claim 18, wherein the application is loosely coupled to the container.

35. The method as recited in claim 18, wherein the application is tightly coupled to the container.

36. A system comprising:
an Enterprise Information System (EIS);
an application;
a container, wherein the EIS is external to the container, and wherein the container comprises:
a connector, wherein the connector is configured to provide an interface between low-level functions of the EIS and the application;
an adapter configured to:
receive a high-level function call from the application, wherein the high-level function call specifies a high-level function of the EIS;
map the high-level function call to a series of low-level function calls to the EIS; and
drive the connector to make the series of low-level function calls to the EIS;
wherein in said mapping the high-level function call to a series of low-level function calls to the EIS, the adapter is further configured to:
access metadata corresponding to the high-level function call, wherein the metadata describes the high-level function of the EIS; and
perform one or more transformations on the high-level function call in accordance with the metadata to produce a data object, wherein the data object includes information for driving a connector to the EIS to make a plurality of low-level calls to the EIS to perform the high-level function;
wherein the EIS is configured to execute the series of low-level functions in response to the series of low-level function calls, wherein said executing the series of low-level functions performs the high-level function of the ETS specified by the high-level function call.

37. The system as recited in claim 36, further comprising:
a metadata repository comprising metadata describing a plurality of high-level functions of the ETS;
wherein, in said accessing the metadata corresponding to the high-level function call, the adapter is further configured to access the metadata corresponding to the high-level function call from the metadata repository.

38. The system as recited in claim 37, wherein the metadata repository is in a persistent store that provides access to the metadata repository to applications within managed environments and applications within unmanaged environments.

39. The system as recited in claim 37, wherein the application is in an unmanaged environment, wherein the application is configured to move from the unmanaged environment to a managed environment without repopulating the metadata repository.

40. The system as recited in claim 37, wherein the metadata repository is implemented in a Java Naming and Directory Interface (JNDI) namespace.

41. The system as recited in claim 36, further comprising:
a metadata repository comprising metadata describing a plurality of high-level functions of the ELS;
wherein, prior to sending the high-level function call, the application is configured to access the metadata repository to discover one or more high-level functions provided by the EIS from the metadata describing the plurality of high-level functions, wherein the specified high-level function is one of the one or more discovered high-level functions.

42. The system as recited in claim 36, wherein the adapter is further configured to:
receive results of said executing the plurality of low-level functions;
store the results of said executing the plurality of low-level functions in a results data object;
perform one or more transformations on the results data object to generate an output data object; and
provide the output data object to the application, wherein the output data object includes the results of the high-level function.

43. The system as recited in claim 36, further comprising:
a metadata repository comprising metadata describing a plurality of high-level functions of the EIS;
wherein the application is further configured to:
access the metadata repository; and
generate a metadata description of the high-level function from the information describing the one or more functions of the EIS;
wherein, in said mapping the high-level function call to a series of low-level function calls to the EIS, the adapter is further configured to:
access the metadata description of the high-level function; and
perform said mapping in accordance with the metadata description.

44. The system as recited in claim 36, further comprising an Application Programming Interface (API) for the adapter, wherein the application is configured to access the adapter in accordance with the adapter API.

45. The system as recited in claim 36, wherein the system further comprises:
an Application Programming Interface (API) to the connector that defines each of the series of low-level function calls to the BIS through the connector, wherein the adapter is further configured to access the connector in accordance with the connector API; and
a metadata repository comprising a metadata description of the high-level function of the EIS, wherein the metadata description maps the high-level function call to the series of low-level function calls to the EIS as defined by the connector API;
wherein, in said mapping the high-level function call to a series of low-level function calls to the BIS, the adapter is further configured to access the metadata description of the high-level function call comprised in the metadata repository.

46. The system as recited in claim 45, wherein the container further comprises:
a different connector configured to provide a different interface between the low-level functions of the EIS and the application; and
an API to the different connector that defines each of the series of low-level function calls to the EIS through the different connector, wherein the adapter is further configured to access the different connector in accordance with the API to the different connector;
wherein the metadata description of the high-level, function call comprised in the metadata repository is modifiable to map the high-level function call to the plurality of low-level function calls to the EIS as defined by the API to the different connector.

47. The system as recited in claim 36, wherein the connector is a Java 2 Enterprise Edition Connector Architecture (J2EE CA) connector.

48. The system as recited in claim 36, wherein the container is an application server.

49. The system as recited in claim 36, wherein the container is a Java Virtual Machine (JVM).

50. A system, comprising:
an Enterprise Information System (EIS);
an application;
an application server container, wherein the EIS is external to the application server container, and wherein the application server container comprises:
a connector, wherein the connector is configured to provide an interface between low-level functions of the EIS and the application;
means for receiving a high-level function call from the application;
means for mapping the high-level function call to a series of low-level function calls to the EIS; and
means for driving the connector to make the series of low-level function calls to the EIS;
wherein the EIS is configured to execute the series of low-level functions in response to the series of low-level function calls, wherein said executing the series of low-level functions performs a high-level function of the EIS corresponding to the high-level function call.

51. The system as recited in claim 50, wherein in said mapping the high-level function call to a series of low-level function calls to the EIS, the container further comprises means for:
accessing metadata corresponding to the high-level function call, wherein the metadata describes the high-level function of the EIS; and
performing one or more transformation on the high-level function call in accordance with the metadata to produce a data object, wherein the data object includes information for driving a connector to the EIS to make a plurality of low-level calls to the EIS to perform the high-level function.

52. The system as recited in claim 51, further comprising a metadata repository comprising metadata describing a plurality of high-level functions of the ELS, wherein the metadata is accessed from the metadata repository.

53. The system as recited in claim 52, further comprising means for providing access to the metadata repository to applications within managed environments and applications within unmanaged environments.

54. The system as recited in claim 52, wherein the application is in an unmanaged environment, further comprising means to move the application from the unmanaged environment to a managed environment without repopulating the metadata repository.

55. The system as recited in claim 52, wherein the metadata repository is implemented in a Java Naming and Directory Interface (JNDJ) namespace.

56. The system as recited in claim 50, wherein the container further comprises means for:
    receiving results of said executing the plurality of low-level functions;
    storing the results of said executing the plurality of low-level functions in a results data object;
    performing one or more transformations on the results data object to generate an output data object; and
    providing the output data object to the application, wherein the output data object includes the results of the high-level function.

57. The system as recited in claim 50, wherein the container further comprises:
    a different connector, wherein the different connector is configured to provide an interface between the low-level functions of the EIS and the application; and
    means for driving the different connector to make the series of low-level function calls to the EIS.

58. The system as recited in claim 50, wherein the connector is a Java 2 Enterprise Edition Connector Architecture (J2EE CA) connector.

59. The system as recited in claim 50, wherein the container is an application server.

60. The system as recited in claim 50, wherein the container is a Java Virtual Machine (JVM).

61. A metadata-aware adapter for a connector to an Enterprise Information System (EIS), configured to:
    receive a high-level function call for a high-level functions of the EIS;
    map the high-level function call to a series of low-level function calls to the EIS; and
    drive the connector to make the series of low-level function calls to the EIS;
    wherein in said mapping the high-level function call to a series of low-level function calls to the EIS, the metadata-aware adapter is further configured to:
    access metadata corresponding to the high-level function call, wherein the metadata describes the high-level function of the EIS; and
    perform one or more transformations on the high-level function call in accordance with the metadata to produce a data object, wherein the data object includes information for driving the connector to the EIS to make a plurality of low-level calls to the EIS to perform the high-level function;
    wherein the EIS is configured to execute the series of low-level functions in response to the series of low-level function calls, wherein said executing the series of low-level functions performs the high-level function of the EIS.

62. The metadata-aware adapter as recited in claim 61, wherein, in said accessing the metadata corresponding to the high-level function call, the metadata-aware adapter is further configured to access the metadata corresponding to the high-level function call from a metadata repository comprising metadata describing a plurality of high-level functions of the EIS.

63. The metadata-aware adapter as recited in claim 62, wherein the metadata repository is in a persistent store.

64. The metadata-aware adapter as recited in claim 61, further configured to:
    receive results of said executing the plurality of low-level functions;
    store the results of said executing the plurality of low-level functions in a results data object;
    perform one or more transformations on the results data object to generate an output data object; and
    provide the output data object to an application from which the high-level function call was received, wherein the output data object includes the results of the high-level function.

65. The metadata-aware adapter as recited in claim 61, wherein the metadata-aware adapter and the connector are comprised in a container, and wherein the high-level function call was generated by an application external to the container.

66. The metadata-aware adapter as recited in claim 65, further comprising an Application Programming Interface (API) for the adapter, wherein the application is configured to access the adapter in accordance with the adapter API.

67. The metadata-aware adapter as recited in claim 61, wherein the series of low-level function calls to the EIS are specific to the connector, wherein, in said mapping the high-level function call to a series of low-level function calls to the EIS, the adapter is further configured to access metadata corresponding to the high-level function call, wherein the metadata maps the high-level function call to the series of low-level function calls to the EIS specific to the connector.

68. The metadata-aware adapter as recited in claim 67, wherein the metadata corresponding to the high-level function is modifiable to map the high-level function call to a series of low-level function calls to the EIS specific to a different connector to the EIS.

69. The metadata-aware adapter as recited in claim 61, wherein the connector is a Java 2 Enterprise Edition Connector Architecture (J2EE CA) connector.

70. The metadata-aware adapter of claim 61, further configured to install in a container comprising the connector.

71. A tangible computer readable medium comprising program instructions, wherein the program instructions are computer-executable to implement:
    an application sending to a container a high-level function call corresponding to a high-level function of a system external to the application;
    the container mapping the high-level function call to a series of low-level function calls to the external system;
    the container causing a connector to the external system comprised in the container to make the series of low-level function calls to the external system;
    the external system executing the series of low-level functions as specified by the series of low-level function calls received from the connector, wherein said executing the series of low-level functions performs the high-level function of the external system corresponding to the high-level function call;

the container receiving results of said executing the plurality of low-level functions;

the container storing the results of said executing the plurality of low-level functions in a results data object;

the container performing one or more transformations on the results data object to generate an output data object, wherein the output data object includes the results of the high-level function; and the container providing the output data object to the application.

72. The tangible computer readable medium as recited in claim 71, wherein the program instructions are further computer-executable to implement including metadata describing a plurality of high-level functions of the external system in a metadata repository.

73. The tangible computer readable medium as recited in claim 72, wherein the program instructions are further computer-executable to implement, prior to sending the high-level function call, the application accessing the metadata repository to discover one or more high-level functions provided by the external system from the metadata describing the plurality of high-level functions, wherein the specified high-level function is one of the one or more discovered high-level functions.

74. The tangible computer readable medium as recited in claim 72, wherein the metadata repository is in a persistent store, wherein the application is in an unmanaged environment, wherein the program instructions are further computer-executable to implement the application moving from the unmanaged environment to a managed environment without repopulating the metadata repository.

75. The tangible computer readable medium as recited in claim 72, wherein the metadata repository is in a Java Naming and Directory Interface (JNDI) namespace.

76. The tangible computer readable medium as recited in claim 71, wherein the application accesses the container in accordance with an Application Programming Interface (API) to the container.

77. The tangible computer readable medium as recited in claim 71, wherein the container accesses the connector in accordance with a connector Application Programming Interface (API) to the connector, wherein the connector API defines each of the series of low-level function calls to the external system through the connector, wherein said mapping the high-level function call to a series of low-level function calls to the external system comprises the container accessing metadata corresponding to the high-level function call, wherein the metadata maps the high-level function call to the series of low-level function calls to the external system as defined by the connector API.

78. The tangible computer readable medium as recited in claim 77, wherein the program instructions are further computer-executable to implement modifying the metadata corresponding to the high-level function to map the high-level function call to the series of low-level function calls to the external system as defined by a connector API corresponding to a different connector to the external system.

79. The tangible computer readable medium as recited in claim 78, wherein the program instructions are further computer-executable to implement:

the application resending to the container the high-level function call corresponding to the high-level function of the external system;

the container accessing the metadata corresponding to the high-level function call to map the high-level function call to the series of low-level function calls to the external system as defined by the connector API to the different connector to the external system;

the container driving the different connector to the external system to make the series of low-level function calls to the external system as defined by the connector API to the different connector to the external system; and the external system executing the series of low-level functions in response to the series of low-level function calls made by the different connector to the external system, wherein said executing the series of low-level functions performs the high-level function of the external system.

80. The tangible computer readable medium as recited in claim 71, wherein the connector is a Java 2 Enterprise Edition Connector Architecture (J2EE CA) connector.

81. The tangible computer readable medium as recited in claim 71, wherein the container is an application server.

82. The tangible computer readable medium as recited in claim 71, wherein the container is a Java Virtual Machine (JVM).

83. The tangible computer readable medium as recited in claim 71, wherein the external system is an Enterprise Information System (EIS).

84. The tangible computer readable medium as recited in claim 71, wherein the application is loosely coupled to the container.

85. The tangible computer readable medium as recited in claim 71, wherein the application is tightly coupled to the container.

* * * * *

UNITED STATES PATENT AND TRADEMARK OFFICE
CERTIFICATE OF CORRECTION

| | | |
|---|---|---|
| PATENT NO. | : 7,152,090 B2 | Page 1 of 1 |
| APPLICATION NO. | : 10/051441 | |
| DATED | : December 19, 2006 | |
| INVENTOR(S) | : Venkat Amirisetty and Pavan S. Bhatnagar | |

It is certified that error appears in the above-identified patent and that said Letters Patent is hereby corrected as shown below:

Claim 45, col. 21, line 67, remove "BIS" and insert --EIS-- in place thereof.

Signed and Sealed this

Twentieth Day of February, 2007

JON W. DUDAS
*Director of the United States Patent and Trademark Office*